(12) United States Patent
McKee

(10) Patent No.: US 8,594,895 B2
(45) Date of Patent: Nov. 26, 2013

(54) METHOD OF OPERATING AN APPARATUS

(75) Inventor: Michael McKee, Crewe (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 1087 days.

(21) Appl. No.: 12/504,449

(22) Filed: Jul. 16, 2009

(65) Prior Publication Data

US 2010/0049410 A1 Feb. 25, 2010

(30) Foreign Application Priority Data

Jul. 17, 2008 (GB) .................................. 0813109.6

(51) Int. Cl.
*G06F 19/00* (2011.01)
*G06G 7/02* (2006.01)

(52) U.S. Cl.
USPC ............. 701/50; 701/29.1; 701/29.6; 701/51; 701/53; 701/54; 701/69; 701/93; 701/432

(58) Field of Classification Search
USPC ........... 701/29.1, 29.5, 50, 51, 53, 54, 69, 93, 701/29.6, 432; 340/441, 444, 466
See application file for complete search history.

(56) References Cited

U.S. PATENT DOCUMENTS

| | | | |
|---|---|---|---|
| 4,731,769 A | | 3/1988 | Schaefer et al. |
| 4,988,996 A | * | 1/1991 | Ito .................................. 340/984 |
| 7,587,264 B2 | * | 9/2009 | Furuno et al. ................. 701/29.6 |
| 2001/0038346 A1 | * | 11/2001 | Learman et al. .............. 340/988 |

(Continued)

FOREIGN PATENT DOCUMENTS

| | | |
|---|---|---|
| EP | 0 811 728 A1 | 12/1997 |
| WO | WO-99/42327 | 8/1999 |

(Continued)

OTHER PUBLICATIONS

Minutes of the Oral Proceedings for European Patent Application No. 09 165 025.9, dated May 10, 2012.

(Continued)

*Primary Examiner* — Khoi Tran
*Assistant Examiner* — Jorge Peche
(74) *Attorney, Agent, or Firm* — Marshall, Gerstein & Borun LLP

(57) ABSTRACT

A method is described of operating an apparatus which has at least two alternative operational modes, and a plurality of controllable operating devices and a controller to which demand signals to operate the controllable operating devices are input by the operator from a main operating control structure, and from which command signals are issued to the controllable operating device, to change the operating states of the devices, and the apparatus further including a warning device, and an auxiliary control structure for the operator to input an auxiliary signal to the controller, the auxiliary control structure being operationally separate from the main operating control structure, at least one of the operating devices having an expected operating state appropriate for an operational mode, the method including determining the selected operational mode in which the apparatus is being operated or is about to be operated, and determining the operating state of the at least one operating device, comparing the determined operating state with the expected operating state and where the determined operating state is not the expected operating state, the controller providing an indication to the operator by the advisory device, and being responsive to the operator changing the operating state of the at least one operating device to the expected operating state using the auxiliary control structure.

10 Claims, 3 Drawing Sheets

(56) References Cited

U.S. PATENT DOCUMENTS

| | | |
|---|---|---|
| 2002/0087245 A1* | 7/2002 | Rossow et al. .................. 701/50 |
| 2004/0004398 A1* | 1/2004 | Nagasaka et al. ............ 307/10.5 |
| 2004/0010359 A1* | 1/2004 | Koch .............................. 701/50 |
| 2005/0134115 A1* | 6/2005 | Betts et al. ................... 307/10.1 |
| 2006/0092033 A1* | 5/2006 | Hoff et al. ..................... 340/679 |
| 2006/0200283 A1* | 9/2006 | Furuno et al. .................. 701/29 |
| 2007/0137338 A1* | 6/2007 | Nishi et al. ...................... 74/335 |
| 2009/0009308 A1* | 1/2009 | Date et al. ..................... 340/439 |
| 2009/0088932 A1* | 4/2009 | Diekhans et al. ............... 701/50 |
| 2009/0135089 A1* | 5/2009 | Konishi et al. ................. 345/1.3 |
| 2009/0171529 A1* | 7/2009 | Hayatoma ....................... 701/36 |
| 2010/0268420 A1* | 10/2010 | Yasui et al. ..................... 701/41 |
| 2011/0109576 A1* | 5/2011 | Giannelli ...................... 345/173 |

FOREIGN PATENT DOCUMENTS

| | | |
|---|---|---|
| WO | WO-00/75736 | 12/2000 |
| WO | WO-2008/054624 A1 | 5/2008 |
| WO | WO-2008/066650 | 6/2008 |

OTHER PUBLICATIONS

Search Report for European Patent Application No. 09 165 025.9, dated Oct. 10, 2009.
Examination Report for GB Application No. 0813109.6, dated Nov. 28, 2011.
Summons to Attend Oral Proceedings for European Patent Application No. 09 165 025.9, dated Dec. 29, 2011.
Search Report for GB0813109.6, dated Nov. 25, 2008.

* cited by examiner

METHOD OF OPERATING AN APPARATUS

BACKGROUND TO THE INVENTION

This invention relates to a method of operating an apparatus. The invention has been devised particularly but not exclusively for a working apparatus of the kind which is capable of performing excavating and/or loading or other earth moving, load shifting type activities.

It will be appreciated that the controlling of such working apparatus requires a complex array of controls. Such apparatus may have many operating devices which require control, and some of these may be controllable by the operator operating mechanical controls, whereas some of these may be controllable by the operator operating virtual controls e.g. using a touch sensitive screen to provide demand signals to a controller which responds by issuing command signals to the operating devices to operate the apparatus.

Throughout this specification, in referring to a control structure, we include both a structure which includes a mechanical control such as a joystick, control knob, push button and the like by means of which an operator may provide an input demand signal to a controller, and a virtual control structure which may include a display screen and a selection device such as a pointing device or other selection device e.g. the display screen may be touch sensitive in an appropriate position, to enable an operator to select an item such as an icon or line of text and thus to provide an input demand signal to the controller. In the latter case, an operator may be required to select a particular page or menu of the display screen in order to display the item the operator wishes to select.

The invention is more particularly concerned with a machine which has alternative operational modes, during each of which some of the operating devices may normally be operated in a preferred or expected operational state which may be different to the preferred or expected operational state of the operating device when the apparatus is being operated in an alternative operating mode.

DESCRIPTION OF THE PRIOR ART

It is known to monitor the operational mode of an apparatus. It is known to monitor the operational state of an operating device. It is known to provide a warning to an operator that an operating device such as an actuator, is in a particular operational state which may not be appropriate or desirable for the operating mode in which the apparatus is operating. However in each case, if the operator then wishes to change the operating state of the operating device, it is necessary for the operator to operate a control of a control structure.

SUMMARY OF THE INVENTION

According to a first aspect of the invention we provide a method of operating an apparatus which has at least two alternative operational modes, and a plurality of controllable operating devices. The controllable operating devices are operable by the operator, and the apparatus further includes a controller to which demand signals to operate the controllable operating devices are input by the operator from a main operating control structure, and from which command signals are issued to the controllable operating devices, to change the operating states of the devices. The apparatus further includes an advisory device, and an auxiliary control structure for the operator to input an auxiliary signal to the controller, the auxiliary control structure being operationally separate from the main operating control structure. At least one of the operating devices has an expected operating state appropriate for an operational mode. The method includes determining the operational mode in which the apparatus is being operated or is about to be operated, determining the operating state of the at least one operating device, comparing the determined operating state with the expected operating state and where the determined operating state is not the expected operating state, the controller providing an indication to the operator by the advisory device, and permitting the operator to change the operating state of the at least one operating device to the expected operating state using the auxiliary control structure.

In accordance with the invention, in the event the operator is advised by the advisory device that the operating state of the at least one operating device is not as expected for the operational mode, there is no need for the operator to operate the main control structure, e.g. by operating a mechanical control, or by scrolling through pages or menus on a display screen in order to display an item which may be selected to change the operating state of the operating device to the expected operating state. Instead, the operator merely needs to operate the auxiliary control structure.

Of course, if an operator wishes to retain the operating device in the sensed, not expected operating state, he may do so.

In a preferred embodiment of the invention, the advisory device is a display screen and the auxiliary control structure is virtual by means of which a selectable item e.g. icon, on the display can be selected to change the operating state of the operating device to the expected operating state, by providing an auxiliary control signal to the controller. Thus the method may include, when the determined operating state is not as expected for the operational mode, activating the auxiliary control structure to enable the operator to change the operating state of the at least one operating device to the expected operating state using the auxiliary control structure.

The advice displayed by the advisory device may include the selectable item on the display screen, which is operable to change the operating state of the operating device to the expected operating state. The advisory indication at least, and desirably the selectable item, are preferably displayed regardless of any menu of items which may already be displayed on the display screen, and preferably the advisory indication and preferably also the selectable item to change the operating state of the operating device to the expected operating state, is displayed in an area or areas of the screen so as not to display over or obscure information otherwise being displayed on the display screen.

Thus the display screen advisory device and a display screen of the main control structure may be one and the same display screen but the control of the main control structure and auxiliary control structure are operationally separate.

In another example though, the advisory indication may be displayed on the display screen, but the auxiliary control structure may be provided by a separate control, such as a push button for example, or a separate touch sensitive screen for another example.

Desirably the method includes determining the operating state of each of the plurality of controllable operating devices, and comparing the operating state of each operating device with an expected operating state appropriate for the operational mode in which the apparatus is being operated or is about to be operated. Where the determined operating state of more than one of the controllable operating devices is not as expected, a separate indication may be provided to the operator on the or a respective advisory device and the auxiliary control structure may be enabled so that using the same auxiliary control structure, the operator may change the operating state of each operating device in turn, as desired, to the expected operating state.

The operational mode in which the apparatus is being operated or is about to be operated, may be operator selectable, and the mode may be determined by the controller receiving a mode input signal from the main control structure, and/or if desired one or more sensors may be provided to sense a position or movement of a physical part of the apparatus relevant to the operational mode.

The operating state of the or each operating device may be determined by the controller receiving a demand signal from the main control structure, and/or one or more sensors may be provided to sense a position or movement of a physical part of the operating device or a member of the apparatus.

The invention is particularly but not exclusively applicable to an apparatus which is a working machine which includes a transmission for imparting drive to a ground engaging structure of the machine so that the machine may move over the ground, and at least one working arm by means of which working operations such as excavating or loading operations for examples only, may be carried out.

Such a machine may be operated in a first, roading, mode when it is desired to drive the machine on a road from one location to another at maximum speed with the working arm inoperable, and a second, working, mode in which the machine may still be driven over the ground but generally at lower speeds, but the working arm, or one of the working arms, is operable.

The main control structure may be used by the operator for normal operation of the machine, with the operator controlling the machine in a selected operational mode, using some or all of the plurality of operating devices in appropriate operating states.

Upon changing operational mode, the operating state of at least one of the operating devices, in which the operating device may be expected to operate, may be inappropriate for the new operational mode. According to the method of the invention, the operator may be advised that the operating device is not in the operating state expected for the new operational mode, and the operator may decide to change the operating state of the operating device to the expected operating state using the auxiliary control structure, without having to select a physical or virtual control of the main control structure.

According to a second aspect of the invention we provide an apparatus capable of being operated by the method of the first aspect of the invention.

BRIEF DESCRIPTION OF THE DRAWINGS

Embodiments of the invention will now be described with reference to the accompanying drawings in which.

DETAILS DESCRIPTION OF PREFERRED EMBODIMENTS

Figure 1:
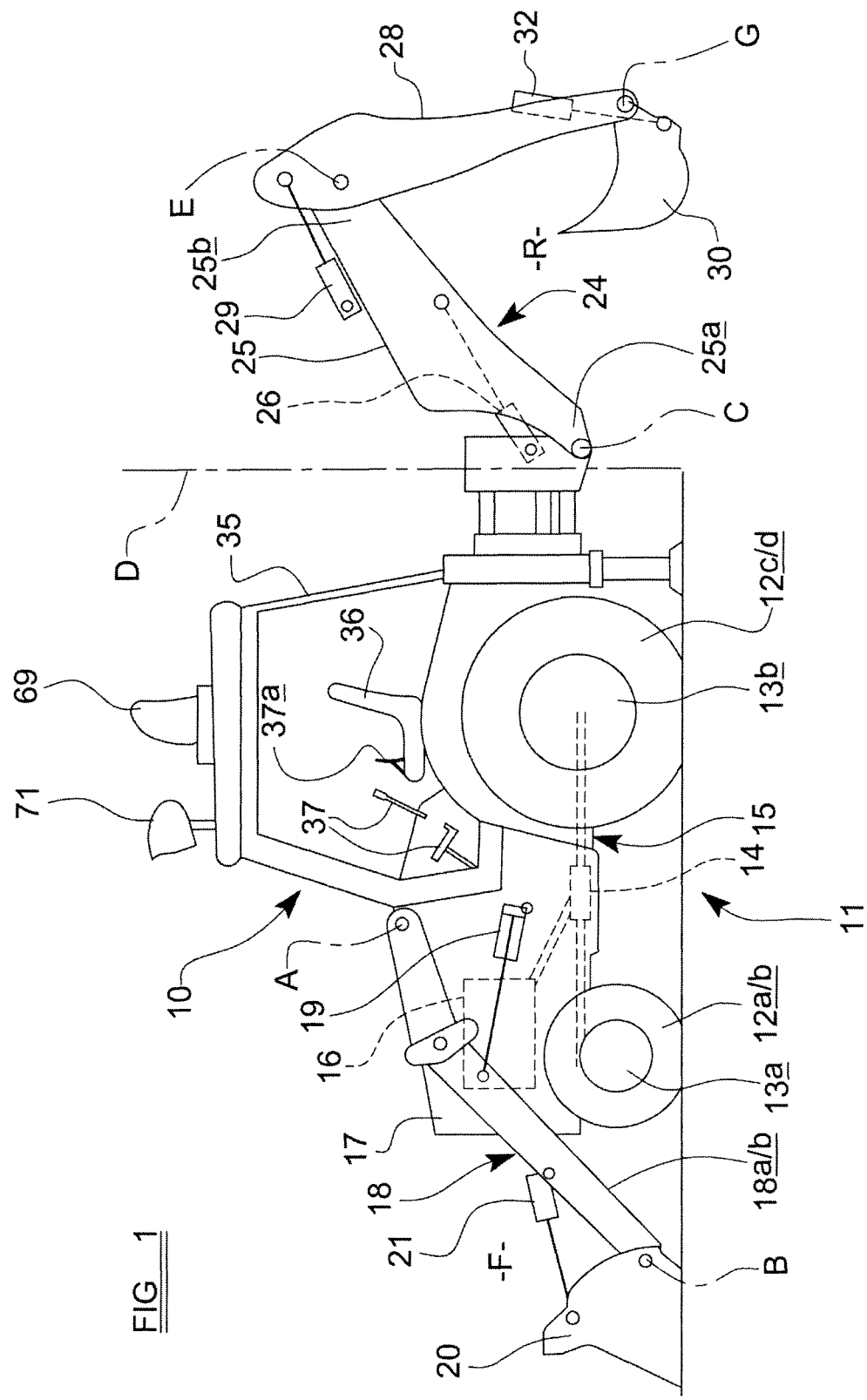
FIG. 1 is an illustrative side view of an apparatus which may be operated in accordance with the method of the invention.

Referring to the drawings a very specific application of the invention will be described, although the invention may be applied in a wide variety of contexts for operating multifarious apparatus.

An apparatus to be controlled in this example, is a working machine 10 of the kind having a ground engaging structure 11 provided by four wheels 12a, 12b, 12c, 12d arranged in pairs on a pair of axles 13a, 13b. In another example the ground engaging structure 11 may alternately be provided by a pair of endless tracks alone or in combination with wheels.

Driving power is transmittable to each of the wheels 12a-12d via a transmission 14. The machine 10 may be driven with all four wheels 12a-12d receiving power via the transmission 14, or as is usual where the machine is to be driven on a road at speed, the transmission 14 may drive only the rear wheels 12c, 12d in two wheel drive.

Power to the transmission 14 is provided by an engine 16 which is provided beneath a bonnet 17 towards a front end F of a body 15 of the machine 10.

Also provided towards the front end F of the machine 10 is a first working arm 18 which in this example is a loading arm 18 including a pair of arm members 18a, 18b which are raisable and lowerable relative to the body 15 either side of bonnet 17, about a first, generally horizontal axis A, by means of a hydraulic actuator 19 at each side of the bonnet 17. The loading arm 18 extends forwardly of the front end F of the machine 10 and carries a working implement, namely a loading bucket 20 (or loading forks) which is moveable relative to the loading arm 18 about a second generally horizontal axis B, by means of another hydraulic actuator 21 provided between the loading arm 18 and the loading bucket 20.

At a rear end R of the machine 10 there is a second working arm being in the present case, an excavating arm 24. The excavating arm 24 includes a boom 25 which is pivotable at one end 25a relative to the body 15 for pivotal movement about a third generally horizontal axis C by means of a hydraulic actuator 26, and a first generally upright axis D by means of a pair of yet further hydraulic actuators 27, not seen in FIG. 1.

Pivoted to an opposite end 25b of the boom 25 for movement relative to the boom 25 about a fourth generally horizontal axis E, is there is a dipper 28, the dipper 28 being pivotal by means of another hydraulic actuator 29, and at the outermost end of the dipper 28, there is an excavating bucket 30 pivoted for movement relative to the dipper 28 about another generally horizontal axis G, by means of yet another hydraulic actuator 32.

The engine 16, transmission 14, and each of the various hydraulic actuators are controlled from an operator's cab 35 provided on the body 15. In the example, in the cab 35 there is an operator's seat 36 which can be moved from the forward facing position shown in the drawings in which the operator drives the machine 10 over the ground, and at which the operator will operate the loading arm 18, and a rearwardly facing position in which the operator will control the second, excavating arm 24. The operator may access different controls 37 depending on whether the seat 36 is facing forwards or rearwards, and/or the seat 36 may carry controls, e.g. joystick controls 37a, by means of which the operator may operate the various hydraulic actuators to perform working operations.

Figure 2:
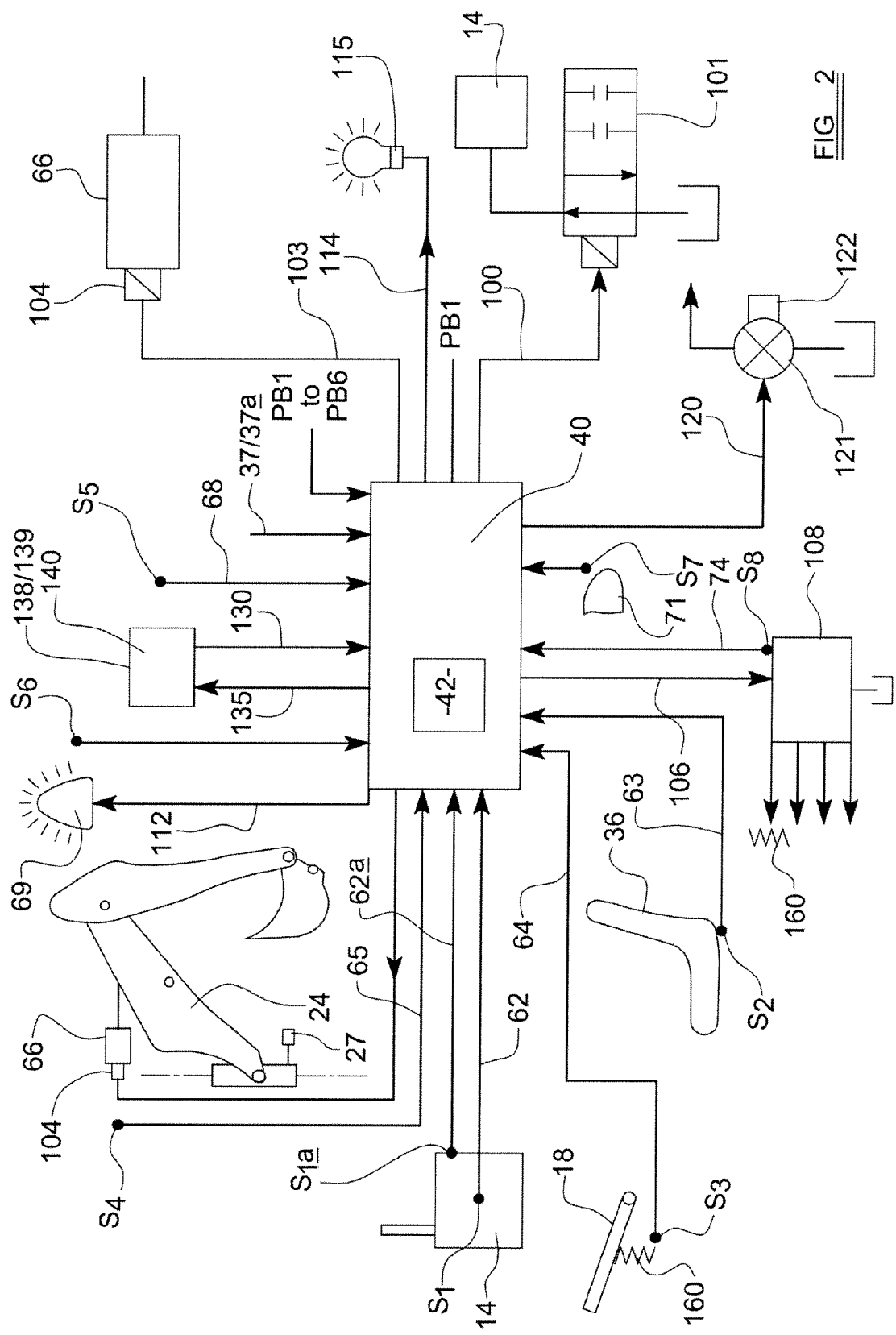
FIG. 2 is an illustrative diagram showing the main and auxiliary control structures.

Referring to FIG. 2, the machine 10 includes a controller 40, which is one or more suitably programmed processors, with an integral or separate look-up table 42, or memory, where data relating to operating parameters of the machine 10 may be stored for use as will be explained.

The controller 40 may be provided by a single or multiple control units which are interconnected to function as now will be described.

It can be seen that the controller 40 has various inputs. Particularly in the example, the controller 40 has a first input 62 from a first transmission sensor S1 which senses when the operator selects forwards drive. The transmission 14 may be manual and/or automatic, and typically may enable an operator to select a (low) gear ratio to drive the machine 10 slowly during the carrying out of working operations or otherwise off-road, and an automatic driving mode in which the gear ratio is automatically selected for on-road driving, to enable the machine 10 to be driven up to a maximum speed. The first sensor S1 in this example, senses when automatic driving mode has been selected, as an indication that the machine 10 is being driven in a roading mode.

A second transmission sensor S1a senses whether four wheel or two wheel drive has been selected, and provides an input 62a to the controller 40.

A second sensor S2 provides an input to the controller 40 to provide an indication of the driver's seat 36 position. In the example, the second sensor S2 provides a signal 63 to the controller 40 to indicate that the driver's seat 36 is in a rearwards facing position to which the operator would normally move the seat 36 to perform excavating operations, using the excavating arm 24.

A third sensor S3 provides an input 64 to the controller 40 to indicate that a hydraulic system, in this case a "smooth ride" system, is operative, such a system enabling damped movement of the loading arm 18 in response to ground irregularities during driving of the machine 10 particularly on road surfaces.

A fourth sensor S4 provides an input 65 to the controller 40 to indicate that a boom lock 66 is operative. Such a boom lock 66 is typically provided to prevent any inadvertent movement of the excavating arm 24 during driving of the machine 10 on-road, and the boom lock 66 typically is electrically operated by a solenoid 104.

A fifth sensor S5 provides an input 68 to controller 40 indicative of the machine's road speed, and a sixth sensor S6 provides an indication that a warning beacon 69, provided on the top of the cab 35, is operative, whilst a seventh sensor S7 provides an input to controller 40 that working lights 71, also provided on top of the cab 35, are illuminated.

An eighth sensor S8 is provided to sense hydraulic demand e.g. hydraulic pressure and/or flow in the hydraulic system, by means of which the various hydraulic actuators are operable. The eighth sensor S8 provides a input 74 to the controller 40.

The sensors S1 to S8 thus each sense an operating state of a part of the machine 10, and thus of an operating device, such as the transmission 14, excavating arm 24, boom lock 66, working lights 71 and beacon 69.

The controller 40 may also receive input from the controls 37/37a in the cab 35 which the operator uses to control the actuators of the loading 18 and excavating arms 24.

The controller 40 in this example is operative to provide command signals to change operating states of operating devices as follows.

An output command signal 100 may provided to a transmission valve 101 to change the transmission between four wheel and two wheel drive; an output command signal 103 may be sent to a solenoid 104 which when de-energised or energised, operates the excavating arm lock 66; a command signal 106 to a valve block 108 of the hydraulic system of the machine 10 may be sent, for example to disable or able the "smooth ride" system 160; a command signal 112 may be sent to the beacon 69 to switch the beacon 69 on or off; a command signal 114 may be sent by the controller 40 to switch on or off driving lights 115 for illuminating in dark conditions when the machine 10 is being driven on the road; a command signal 120 to a hydraulic speed controller 122 to increase or decrease the amount of pressurised hydraulic oil available for use, for example by switching in or out additional hydraulic pumps and/or by varying the output of one or more hydraulic pumps 121.

It can be seen in FIG. 2 that there is a connection 130 to and connection from 135, a display screen 140 of a virtual main control structure 138 and an auxiliary control structure 139.

The main control structure of the machine 10, in addition to the display screen 140 typically would include an array of physical controls to enable various functions of the machine 10 to be controlled. These may include the joystick 37a and other 37 controls in the cab 35, and push-button switches for switching operating states of operating devices in normal use. For example, a push-button switch PB1 may be provided for switching the machine 10 between two wheel and four wheel drive, the controller 40 responding to a control input from the switch PB1 by providing a suitable signal to transmission valve 101 to change the transmission for example, from a default two wheel drive mode to four wheel drive mode.

A second push-button switch PB2 may be provided to activate or de-activate the excavating arm lock 66, the controller 40 responding to pressing of the switch PB2 by providing a command signal 103 to activate or de-activate the solenoid 104 to operate/deactivate the lock 66.

Other inputs to the controller 40 to operate the various operating devices of the machine 10 may be input via the display screen 140 of the virtual main control structure 138, the operator selecting pages and/or menus as necessary on the display screen 140 and using a pointing device or otherwise selecting an appropriate item, to operate or de-activate a machine function.

Figure 3:
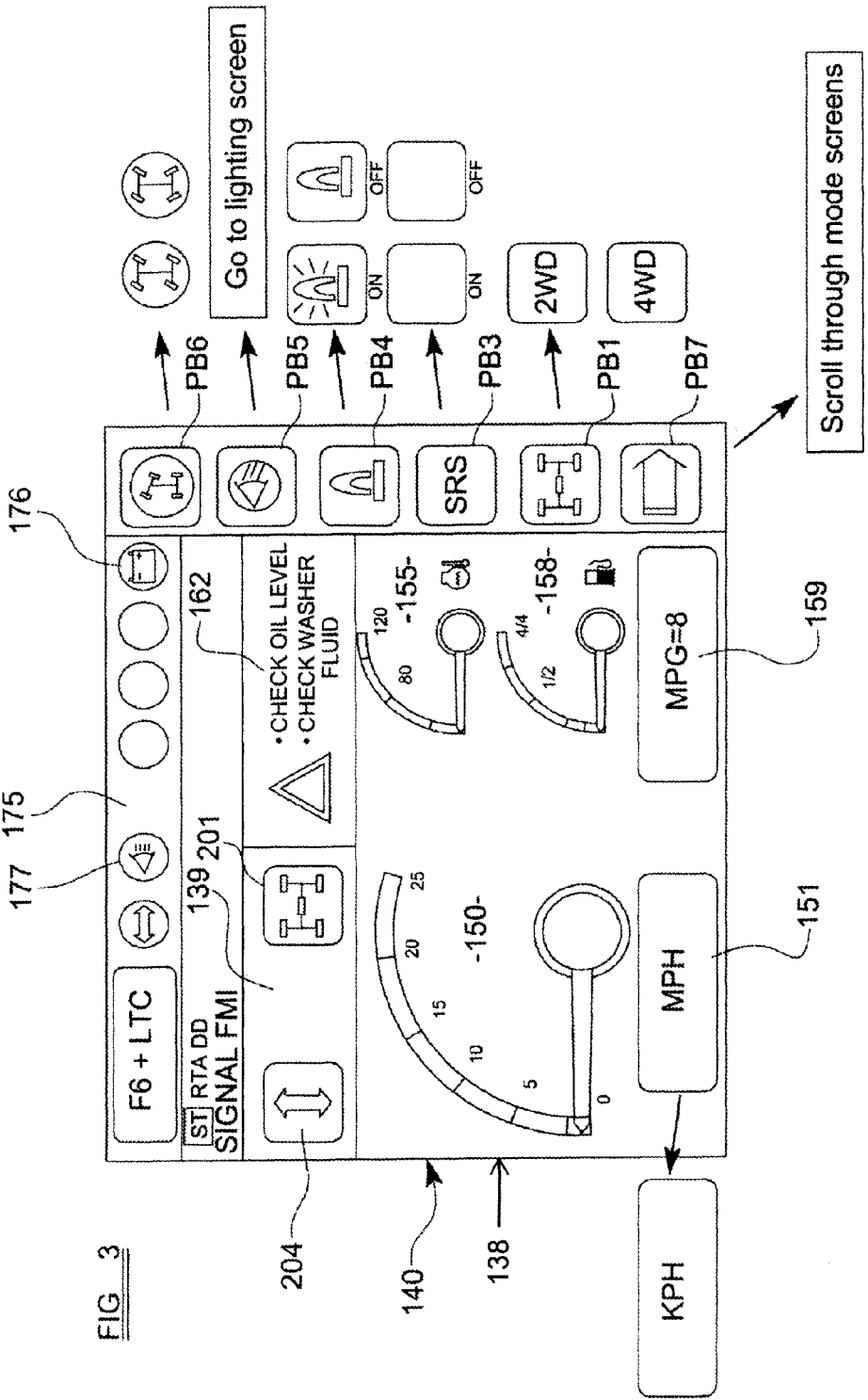
FIG. 3 is an illustrative view of a display screen of the apparatus of FIG. 1.

Referring to FIG. 3 the display screen 140 is shown. This is a touch sensitive screen by means of which, by touching particular designated areas of the screen for example where an icon is displayed, an input signal to the controller 40 may be generated which is relevant to the displayed icon.

In FIG. 3 a particularly menu has been selected, in which information relating to driving conditions of the machine 10 primarily on the road, are shown being displayed. In one area 150 of the screen 140, there is displayed a virtual speedometer. Beneath the speedometer 150, a virtual control i.e. an icon 151 is displayed which if selected by repeatedly touching the screen 140 at area 151, will signal the controller 40 to display the machine road speed on the speedometer in miles per hour as shown, or alternatively kilometers per hour, as desired.

On another area of the screen 140, indicated at 155, there is displayed the engine temperature, and in another area 158 of the screen 140, the state of fill of a fuel tank of the machine 10 is displayed, in each case with easily recognisable icons. Beneath the area 158 of the screen 140, a virtual control being another icon 159 is displayed, which also displays information, namely the current fuel consumption rate. By selecting the icon 159 by repeatedly touching the screen 140 in the area of the icon 159, the controller 40 displays the fuel consumption in miles per gallon or kilometers per liter, for examples.

The display screen 140 also is shown displaying icons, in this case actual words, in an area 162 of the screen 140, displaying warnings to check engine oil levels and windscreen washer fluid levels. At a side of the display screen 140, there are provided a plurality of push-button/touch sensitive buttons, including PB1 for changing the transmission between two and four wheel drive.

Button PB3 when pressed, selects or de-selects operation of the smooth ride system 160, whilst button PB4 turns on or off the beacon 69; button PB5 causes an alternative menu or lighting screen to be displayed by the display screen 140 so that machine driving lights 115 can be turned on or off as required, for example; button PB6 is provided to cause another menu or steering mode screen to be selected by the display screen 140, to enable two wheel, four wheel or crab steering to be selected. Button PB7 enables alternative menus/screens to be displayed, by scrolling through the screens or a menu of the displayable screens.

The buttons PB1 and PB3 to PB7 may preferably all be touch sensitive or may be physical buttons as required, each providing a demand signal to the controller 40 either to cause an alternative page/menu to be displayed by screen 140 (as in the case of buttons PB5 and PB6) and to change the operating state of an operating device of the machine 10, as with buttons PB1 and PB3 and PB4.

The buttons PB1 and PB3 to PB7 in another example, instead of being separate from the display screen 140, may be provided as virtual controls on another display area of the display screen 140, or may be completely separate in another area of the cab 35 to the display screen 140.

At a top of the display screen 140 in an area depicted at 175, other icons are shown displayed (or these may be physically separate from the display screen 140) which may be illuminated under certain conditions arising. For example only, an icon 176 may illuminate to show that a battery of the machine 10 is not charging, whilst another icon 177 may illuminate to show that full un-dipped headlights of the machine 10, are illuminated.

In a further area 139 of the display screen 140 there is displayed a further icon 201 which in the example is the same as the icon displayed by button PB1, which is usable by the operator to select or de-select two or four wheel drive. Also in area 139, there is a "scroll" icon 204 for a purpose to be described.

Examples of performance of the method of the invention will now be described.

Assuming that the machine 10 is operating in a first working mode in which the operator is facing forwards F, and is using the controls 37/37a to operate the loading arm 18 and its various functions, the operator drives the machine 10 slowly in a selected low gear to a road and then intends to drive the machine 10 on the road. The beacon 69 may be off and the working lights 71 may be in an "on" condition, and four wheel drive mode may have been selected by the operator previously, using button PB1 of the array of controls buttons PB1 and PB3 to PB7 of the main control structure. For the purposes of illustration, in the working mode described, the excavating arm 24 will be folded with the dipper 28 as close to the boom 25 as possible, and with the excavating arm 24 extending across the back of cab 35 so that the excavating arm 24 projects minimally from the rear 23 of the machine 10.

To drive the machine 10 on the road, the working lights 71 would normally be switched off and the beacon 69 would be switched on. The boom lock 66 for locking the excavator arm 24 should be employed. It is preferred for the machine 10 to be operated in two wheel drive on the road for fuel economy, and desirably the machine 10 is operated in two wheel rather than four wheel steer.

For the purposes of the illustration, it is assumed that the operator forgets to engage the boom lock 66 and to turn on the beacon 69 and to engage two wheel drive, but remembers to raise the arm loading 18 and engage two wheel steer, and turn off the working lights 71.

Upon the operator operating the transmission 14 to select automatic drive, to enable the machine 10 to be driven on-road at up to maximum speed, the sensor S1 will provide the input 62 to the controller 40 and thus the operational mode, i.e. roading mode, will be sensed. The controller 40 then compares various parameters relevant to roading mode, with information in the look-up table 42 or other memory. The controller 40 will determine that it is expected that for roading mode, the machine 10 will be driven in two wheel drive mode, but the input 62a from sensor S1a will indicate that the machine 10 is being driven in four wheel drive mode. Also the controller 40 will determine that it is expected that the boom lock 66 will be engaged, but the input 65 from sensor S4 will indicate that the boom lock 66 is not engaged, and the controller 40 will determine that the beacon 69 is off (sensed by sensor S6) and it is expected that in roading mode the beacon 69 is on, but that because working lights 71 were in use just prior to when roading mode was selected it is probably dark and so it is expected that the machine driving lights 115 are on, but sensor S7 indicates that the driving lights 115 are switched off.

The controller 40 provides advisory instructions to the operator by displaying in turn, appropriate icons 201 in the area 139 of the display screen 140 which constitutes an auxiliary display of an advisory device. In the example of FIG. 3, the icon 201 being displayed is an advisory indication that the machine 10 is being operated in four wheel drive whereas in the present operational mode, i.e. roading, it is expected that the machine 10 will be operated in two wheel drive.

Having been provided with this advisory indication by the advisory device 39/201, it is up to the operator to decide whether to maintain four wheel drive, or to switch to the, expected, two wheel drive. However in accordance with the invention, if the operator wishes to change to two wheel drive, the operator does not need to find and then push/select the appropriate button PB1 of the control button array of the main control structure, in order to change the operating state of the transmission 14. Simply the operator may select the icon 201 by touching the icon 201 of the auxiliary control structure, to provide an input 130, to signal the controller 40 to send a command signal 100 to the valve 101 of the transmission 14 to change to two wheel drive operating state. Upon the operator selecting the icon 201 to change to two wheel drive operating mode, or if the operator decides to maintain four wheel drive in roading mode, upon the operator taking no action, a further icon may then automatically be displayed by the advisory device 139 at 201, to indicate that the boom lock 66 has not been engaged. If desired, this icon 201 may be displayed upon the operator selecting the scroll icon 204 alternatively, to show in turn, all relevant advisory indications.

The operator may decide to maintain the not-engaged boom lock 66 operating state, but typically will select icon 201 of the auxiliary control structure to change the operating state of the boom lock 66 to "engaged". Upon icon 201 being so selected, an input 130 to the controller 140 will cause controller 40 to send a command signal 103 to the boom lock 66 solenoid 104, to engage the boom lock 66, and thus the operator will not need to scroll though menus/pages of the display screen 140 until an appropriate screen is displayed with a control displayed which may be touched to engage the boom locked operating state.

Next automatically, or upon the operator touching the scroll 204 in the area 139 of the display screen 140 providing the advisory device, an icon 201 will be displayed to indicate that the beacon 69 is off when in roading mode it is expected that the beacon 69 will be switched on. The operator may switch on the beacon 69 by selecting the icon 201 of the auxiliary control structure by touching the icon 201 to provide an input 130 to the controller 40 which in response provides a command signal 112 to switch the beacon 69 on. Upon this occurrence, the display screen 140 may then display in area 139 an icon 201 to advise the operator that the machine's road lights 115 are switched off. The operator may elect to switch on the machine's road lights by selecting the icon 201 again, by touching the screen 140. Thus in each case, a specific control to switch on the beacon 69, or to switch on the lights 115 need not be found and selected for the operating states of these functions to be changed.

In another example, upon the operator changing operational modes to an excavating mode, when the operator's seat 36 will be pivoted to a rearwards facing position, the sensor S2 may provide a signal to the controller 40 that excavating operational mode has been selected.

In excavating mode it may be expected that the boom lock 66 is disengaged. Also in excavating mode, the hydraulic system may require an increased supply of pressurised hydraulic fluid to operate each of the actuators 26, 27, 29, 32 of the excavating arm 24.

The controller 40 upon being signalled of the change to excavating operational mode by sensor S2, may compare the sensed boom lock 66 condition, sensed by sensor S4 and the hydraulic pressure/flow sensed by sensor S8 and compare the sensed inputs with the expected states stored in the look-up table 42.

In the event that the operator has not disengaged the boom lock 66, an appropriate icon 201 will be shown in the area 139 of the display screen 140 to provide an advisory indication that the expected disengaged state of the boom lock 66 has not been effected. The operator may disengage the boom lock 66 not by finding the necessary physical control, or by scrolling through menus/pages of the display screen 140, but simply by selecting (touching) the icon 201 displayed to provide the input 130 to the controller 40 which issues a "boom lock disengage" command signal 103 to the boom lock solenoid 104.

Subsequently, or automatically after a set period of time, or when the operator selects the scrolling icon 204, an appropriate icon 201 indicating that an increased pressurised hydraulic fluid supply is required may be displayed in area 139 of the display screen 140. The operator may in response scroll through menus/pages of the display screen 140 to find a virtual control to increase the hydraulic fluid supply, or may simply select (touch) displayed icon 201 which provides an auxiliary control of an auxiliary control structure, to signal the controller 140 to send a command signal 120 to the hydraulic speed controller 122 to increase the hydraulic fluid supply.

The embodiments described are purely exemplary. The machine 10 thus has a main control structure which includes all of the physical controls the operator may operate/press to change the operating states of the various operating devices, (and the operational mode of the machine 10), and the various virtual controls of the main control structure, displayed by screen 140, by means of which the operator may normally operate the operating devices of the machine 10. In each case an auxiliary control structure, physical and/or virtual, e.g. in area 139 of the display screen 140 may be used to change the operating state of an operating device, when the operational mode of the machine 10 is changed, without the operator having to find and operate a physical and/or virtual control of the main control structure.

It will be appreciated that whereas in the embodiments described, there are physical sensors S1 to S8 to sense and determine the operating states of the various operating devices, in another example, where a control of the main control structure is operated to actuate a particular function e.g. the illumination of the beacon 69 or the driving lights 115, via the controller 40, as desired, the controller 40 may determine that the beacon 69 is on or off or that the lights 115 are on or off from the last appropriate input signal input to the controller 40 from the main control structure, so that physical sensor S6 as in the example described would not be required.

Also, a change in operational mode may be determined by the controller 40 receiving a demand signal from the main control structure, rather than requiring a sensor to indicate a change of operational mode may be effected by operator selection, or otherwise.

An input or command signal may be provided by the absence or presence or an electrical current, so that the command signal 114 to the lights 115 for an example, to switch off the lights 115, may be the absence of electrical current necessary to illuminate the lights 115.

The method of the invention may be applied to many different working machines having a wide variety of operating devices which have preferred or expected operating states when operating in particular operational modes, and indeed to any other working apparatus which has alternative operational modes and at least one operating device with controllable operating states.

The invention claimed is:

1. A method of operating an apparatus which has at least two alternative operational modes, the method comprising providing the apparatus with a plurality of controllable operating devices, each controllable operating device having alternative operating states and being operable by the operator, each of the controllable operating devices having an expected operating state appropriate for one of the two alternative operational modes, and providing the apparatus with a controller comprising at least one processor to which demand signals to operate the controllable operating devices are input by the operator from a main operating control structure, and from which command signals are issued to the controllable operating devices, to change the operating states of the devices, providing the apparatus with an advisory device, and providing the apparatus with an auxiliary control structure for the operator to input an auxiliary signal to the controller, the auxiliary control structure being operationally separate from the main operating control structure and arranged to change the operating state of each of a plurality of operating devices as prompted by the advisory device, each of the controllable operating devices having an expected operating state appropriate for one of the two alternative operational modes, wherein the method further comprises determining with the controller the operational mode in which the apparatus is being operated or is about to be operated, determining with the controller the operating state of at least one of the plurality of operating devices, the controller comparing the determined operating state with the expected operating state, and where the determined operating state is not the expected operating state, the controller providing an indication to the operator by the advisory device, and the controller permitting the operator to change the operating state of the at least one operating device to the expected operating state using the auxiliary control structure when the determined operating state is not the expected operating state.

2. A method according to claim 1 wherein the advisory device is a display screen and the auxiliary control structure is virtual by means of which a selectable item on the display can be selected to change the operating state of the operating device to the expected operating state, by providing an auxiliary control signal to the controller.

3. A method according to claim 2 wherein when the operator is advised by the advisory device that the operating state is not as expected for the operational mode, the method includes activating the auxiliary control structure to enable the operator to change the operating state of the at least one operating device to the expected operating state using the auxiliary control structure.

4. A method according to claim 2 wherein the advisory indication displayed includes the selectable item on the display screen, which is operable to change the operating state of the operating device to the expected operating state.

5. A method according to claim 2 wherein the advisory indication at least, and desirably the selectable item, are displayed together with any menu or page of items which are already displayed on the display screen in an area or areas of the screen so as not to display over or obscure information otherwise being displayed on the display screen.

6. A method according to claim 2 wherein the advisory indication is displayed on the display screen, and the auxiliary control structure is provided by a separate control.

7. A method according to claim 1 wherein the operational mode in which the apparatus is being operated or is about to be operated, is determined by the controller receiving a mode input signal from the main control structure.

8. A method according to claim 1 wherein the operational mode is determined by the controller receiving a mode input signal from one or more sensors which senses a position or movement of a physical part of the apparatus relevant to the operational mode selected.

9. A method according to claim 1 wherein the apparatus is a working machine which includes a transmission for imparting drive to a ground engaging structure of the machine so that the machine may move over the ground, and at least one working arm by means of which working operations may be carried out.

10. An apparatus having at least two alternative operational modes, and a plurality of controllable operating devices having alternative operating states, the controllable operating devices being operable by the operator, and the apparatus further including a controller to which demand signals to operate the controllable operating devices are input by the operator from a main operating control structure, and from which command signals are issued to the controllable operating devices, to change the operating states of the devices, and the apparatus further including an advisory device, and an auxiliary control structure for the operator to input an auxiliary signal to the controller, the auxiliary control structure being operationally separate from the main operating control structure, at least one of the operating devices having an expected operating state appropriate for a selected operational mode from the at least two operational modes, the controller configured to determine the operational mode in which the apparatus is being operated or is about to be operated, to determine the operating state of the at least one operating device, and to compare the determined operating state with the expected operating state and where the determined operating state is not the expected operating state, the controller providing an indication to the operator by the advisory device, and being responsive to the operator changing the operating state of the at least one operating device to the expected operating state using the auxiliary control structure.

* * * * *